United States Patent
Subbiah et al.

(10) Patent No.: US 10,108,432 B1
(45) Date of Patent: Oct. 23, 2018

(54) GENERATING A SCRIPT BASED ON USER ACTIONS

(75) Inventors: Thirugnanam Subbiah, Irving, TX (US); Raghunath Battula, Sunnyvale, CA (US); Kenneth W. Hanscom, Thousand Oaks, CA (US); Charles R. Honton, Cleveland Heights, OH (US); Don E. Bernal, San Francisco, CA (US); Gang Wang, San Diego, CA (US); David L. Henry, Livingston, TX (US)

(73) Assignee: INTUIT INC., Mountain View, CA (US)

( * ) Notice: Subject to any disclaimer, the term of this patent is extended or adjusted under 35 U.S.C. 154(b) by 1236 days.

(21) Appl. No.: 12/425,177

(22) Filed: Apr. 16, 2009

(51) Int. Cl.
*G06F 9/44* (2018.01)

(52) U.S. Cl.
CPC ...................... *G06F 9/44* (2013.01)

(58) Field of Classification Search
CPC .......... G06F 17/30864; G06F 17/3089; G06F 17/30867; G06F 17/30672; G06F 17/30899; G06F 9/44
USPC ........ 717/106–110; 703/1–22; 715/700–866; 345/418–475
See application file for complete search history.

(56) References Cited

U.S. PATENT DOCUMENTS

| | | | |
|---|---|---|---|
| 6,360,332 B1 * | 3/2002 | Weinberg | G06F 11/3688 714/38.13 |
| 6,614,430 B1 * | 9/2003 | Rappoport | 345/420 |
| 6,981,225 B1 * | 12/2005 | Gaudette | G06F 17/212 707/E17.109 |
| 7,139,746 B2 * | 11/2006 | Shin et al. | 707/736 |
| 7,155,451 B1 * | 12/2006 | Torres | |
| 7,200,804 B1 * | 4/2007 | Khavari et al. | 715/230 |
| 7,324,983 B1 * | 1/2008 | Morris et al. | 706/48 |
| 7,519,902 B1 * | 4/2009 | Kraft et al. | 715/234 |
| 8,285,654 B2 * | 10/2012 | Bajrach | G11B 27/031 706/14 |
| 2002/0174182 A1 * | 11/2002 | Wilkinson et al. | 709/205 |
| 2003/0005044 A1 * | 1/2003 | Miller et al. | 709/203 |
| 2003/0053420 A1 * | 3/2003 | Duckett | G06F 11/3495 370/252 |
| 2003/0126134 A1 * | 7/2003 | Messing | G06F 17/30899 |
| 2003/0135752 A1 * | 7/2003 | Sokolic | G06F 21/6245 726/21 |
| 2003/0164850 A1 * | 9/2003 | Rojewski et al. | 345/733 |
| 2003/0200466 A1 * | 10/2003 | Nelson et al. | 713/202 |
| 2004/0059809 A1 * | 3/2004 | Benedikt et al. | 709/224 |
| 2005/0071766 A1 * | 3/2005 | Brill et al. | 715/738 |

(Continued)

*Primary Examiner* — Jae U Jeon
(74) *Attorney, Agent, or Firm* — Patterson + Sheridan, LLP

(57) ABSTRACT

Embodiments of a computer system, a method and a computer-program product (e.g., software) for use with the computer system are described. These embodiments may allow users to create or maintain (including repair and validation), which collect user information from a web page. In particular, using a web browser extension, one or more users' actions while navigating or interacting with the web page are captured. This captured user-action information may specify the layout of the web page, including data locations and/or types of data. Then, using the captured user-action information, a new scraping script can be generated or, based at least in part on determined changes to the web page, an existing scraping script can be maintained.

19 Claims, 5 Drawing Sheets

(56) References Cited

U.S. PATENT DOCUMENTS

| | | | |
|---|---|---|---|
| 2005/0198353 A1* | 9/2005 | Zmrzli | G06F 17/30899 |
| | | | 709/232 |
| 2006/0005132 A1* | 1/2006 | Herdeg, III | 715/704 |
| 2006/0080321 A1* | 4/2006 | Horn | G06F 17/30867 |
| 2008/0071819 A1* | 3/2008 | Monsarrat | 707/102 |
| 2008/0270253 A1* | 10/2008 | Huang | 705/26 |
| 2013/0124856 A1* | 5/2013 | Agrawal et al. | 713/156 |

* cited by examiner

GENERATING A SCRIPT BASED ON USER ACTIONS

BACKGROUND

The present invention relates to techniques for generating a script to scrape a web page based on actions of a user while navigating through the web page.

Online account systems (such as Internet Banking) are increasingly popular. These websites allow easy access to account balance and transaction information for a single online merchant or financial institution. However, for a complete understanding of an individual's or a business' financial position, data from multiple merchants and financial institutions may need to be aggregated.

Several existing web services provide aggregated financial information that is collected from online accounts using Open Financial Exchange (OFX). However, not all of the websites that host online accounts support OFX. To address this problem, a central server can be used to aggregate the financial information. Using customer credential information (such as a username and password) to login to an online account on a website, this server can collect or scrape the appropriate data from the returned formatted web pages, and thus, can aggregate the financial information.

Typically, the financial information is collected from websites using scraping scripts. A scraping script usually includes commands that parse and interact with one or more web pages via a network, such as the Internet. For a scraping script to function properly, it is typically designed based on the details of a given web page (such as the web page flows to login and access data), so that the relevant customer financial information can be located and collected. For example, a scripting engineer may manually analyze the financial institution's web page to determine the sequence of commands needed to navigate and obtain specific data from this web page. Therefore, creating a scraping script can be time-consuming and expensive.

In addition, if the financial institution modifies a particular website and/or if there are changes to a customer's online account, a scraping script may not function correctly. When this occurs, a scripting engineer typically has to access the website to duplicate the exact problem that the server encountered, and then update the scraping script accordingly. This process is also expensive and can be time-consuming.

SUMMARY

One embodiment of the present invention relates to a computer system that generates a script. During operation, the computer system receives user-action information that was captured during a session where a user accessed a web page. This captured user-action information includes information about how the user navigated through the web page during the session, a layout of the web page, and data locations on the web page. Then, the computer system generates the script based at least in part on the captured user-action information, where the script is configured to execute on the computer system to scrape information from the web page without user intervention, and where generating the script involves translating the captured user-action information into executable operations.

In some embodiments, generating the script involves determining changes to the web page based at least in part on the captured user-action information and revising an existing script based at least in part on the determined changes. This may be useful for web pages that are occasionally modified.

Note that the user-action information may have been captured by a software application that executes in a virtual environment of a web browser. In some embodiments, prior to receiving the user-action information, the computer system receives a request for the software application from the user and, in response to the request, provides the software application.

The software application may avoid capturing sensitive information to assure the user that there is no risk associated with the capture of the user-action information. Consequently, the user-action information may exclude credential information provided by the user through the web page during the session.

Furthermore, the user-action information may include metadata associated with the data locations. This metadata may specify types of data.

Additionally, the user-action information may include one or more events in which the user communicated information with a host system that hosts the web page. During at least one of the one or more events, the user may have provided data to the host system, for example, by selecting an item in a menu or by typing information into a field.

Note that the user-action information may include information corresponding to at least a portion of a hierarchical structure of the web page (however, in other embodiments the entire web page may be captured). This hierarchical structure may specify the layout of the web page and the data locations. For example, the hierarchical structure may include a set of nodes corresponding to an eXtensible markup language (XML) path.

In some embodiments, the computer system repeats the receiving operation for multiple users in multiple sessions. Then, using the captured user-information from the multiple users, the computer system may generate the script.

Another embodiment provides a method including at least some of the above-described operations.

Another embodiment provides a computer-program product for use in conjunction with the computer system.

Figure 1:
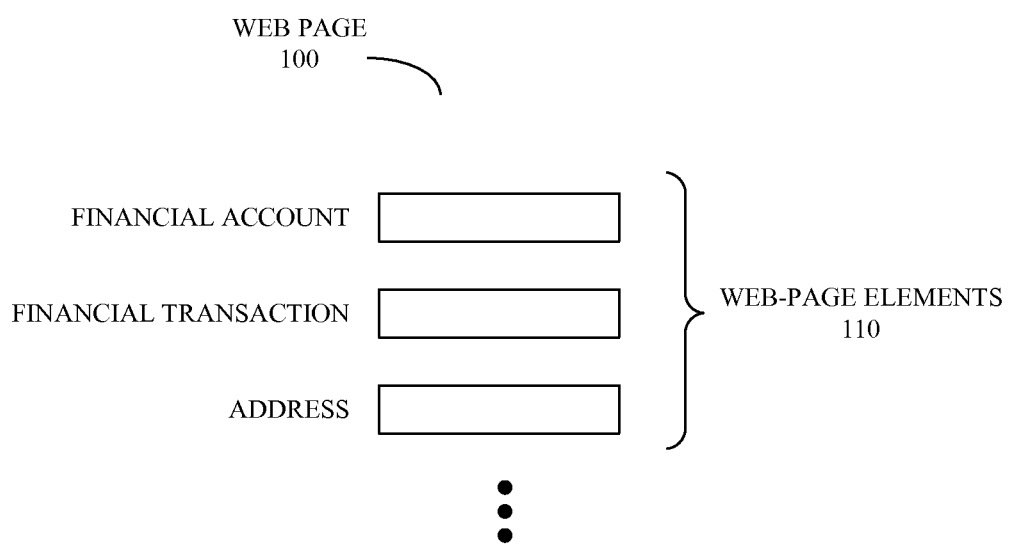
FIG. 1 is a block diagram illustrating a web page in accordance with an embodiment of the present invention.

Table 1 provides an illustration of an eXtensible markup language (XML) path (XPath) for a web-page element and corresponding macro commands in a scraping script.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method and a computer-program product (e.g., software) for use with the computer system are described. These embodiments may allow users to create or maintain (including repair and validation) scraping scripts, which collect user information from a web page. In particular, using a web browser extension, one or more users' actions while navigating or interacting with the web page are captured. This captured user-action information may specify the layout of the web page, including data locations and/or types of data. Then, using the captured user-action information, a new scraping script can be generated or, based at least in part on determined changes to the web page, an existing scraping script can be maintained.

This scripting technique can reduce the time and expense associated with creating new scraping scripts or maintaining existing scraping scripts. Consequently, this scripting technique may reduce the costs of software providers that use scraping scripts. In addition, by helping to maintain the freshness of scraping scripts, this scripting technique can improve the satisfaction and productivity of users of the software provider's products because the ability of these products to aggregate user financial information (for subsequent use in these products) may be more reliable.

We now describe embodiments of a process for generating a scraping script. In the discussion that follows, 'generating' should be understood to include creating a new scraping script and/or maintaining an existing scraping script.

FIG. 1 presents a block diagram illustrating a web page 100, such as a web page associated with a financial institution. This web page includes multiple page elements 110 (such as data fields) in which users can provide information (for example, a page element may be a text box) or select information (for example, a page element may be a pull-down menu). When creating a new scraping script, a scripting engineer typically needs to determine the locations of web-page elements 110 on web page 100. In addition, the scripting engineer typically needs to determine the types of data associated with web-page elements 110. These tasks are often accomplished by detailed examination of the HyperText Markup Language (HTML) of web page 100. Similarly, when maintaining an existing scraping script (such as when a problem occurs during scraping of web page 100), the scripting engineer may need to: reproduce the problem, fix the problem by modifying the scraping script, and then verify that the fix works reliably.

In the discussion that follows, a scripting technique that significantly reduces the effort needed to generate the scraping script is described. For example, the time needed to update an existing scraping script may be reduced by 50-75%. As an illustration of this scripting technique, one or more users of financial software agree to allow their actions while accessing their financial accounts at one or more financial institutions to be captured by a provider of the financial software. Using the captured user-action information from at least one user, the provider of the financial software can generate the scraping script.

In particular, the one or more users may agree to download a web-browser extension (such as a Mozilla Firefox extension or an Internet Explorer™ Browser Helper Object), or more generally a software application, that records the way the one or more users navigate through and interact with a website of a given financial institution (which includes one or more web pages) while accessing their financial accounts during one or more sessions. (Note that the one or more users may selectively enable or disable the web-browser extension.)

Then, the web-browser extension may upload the captured user-action information to a web service offered by the provider of the financial software via a network. This captured user-action information includes a sequence of events and tasks that allow the scraping script to be generated, for example, by software (such as a generating module) that mimics the actions of the one or more users. Moreover, the captured user-action information can be stored for use in generating other scraping scripts in the future. In this way, multiple additional users (who did not agree to download the web-browser extension) can benefit from the scraping script.

In general, the scraping script may be executed on a different computer system (or server) than the computer system that the web-browser extension executes on. For example, the web-browser extension may execute on a client computer, while the scraping script may execute on a central server. To facilitate this, generating the scraping script may involve translating the captured user-action information into corresponding commands or operations that can execute on the server. However, in other embodiments, note that the scraping script may execute on another web-browser extension on the client computer.

Figure 2:
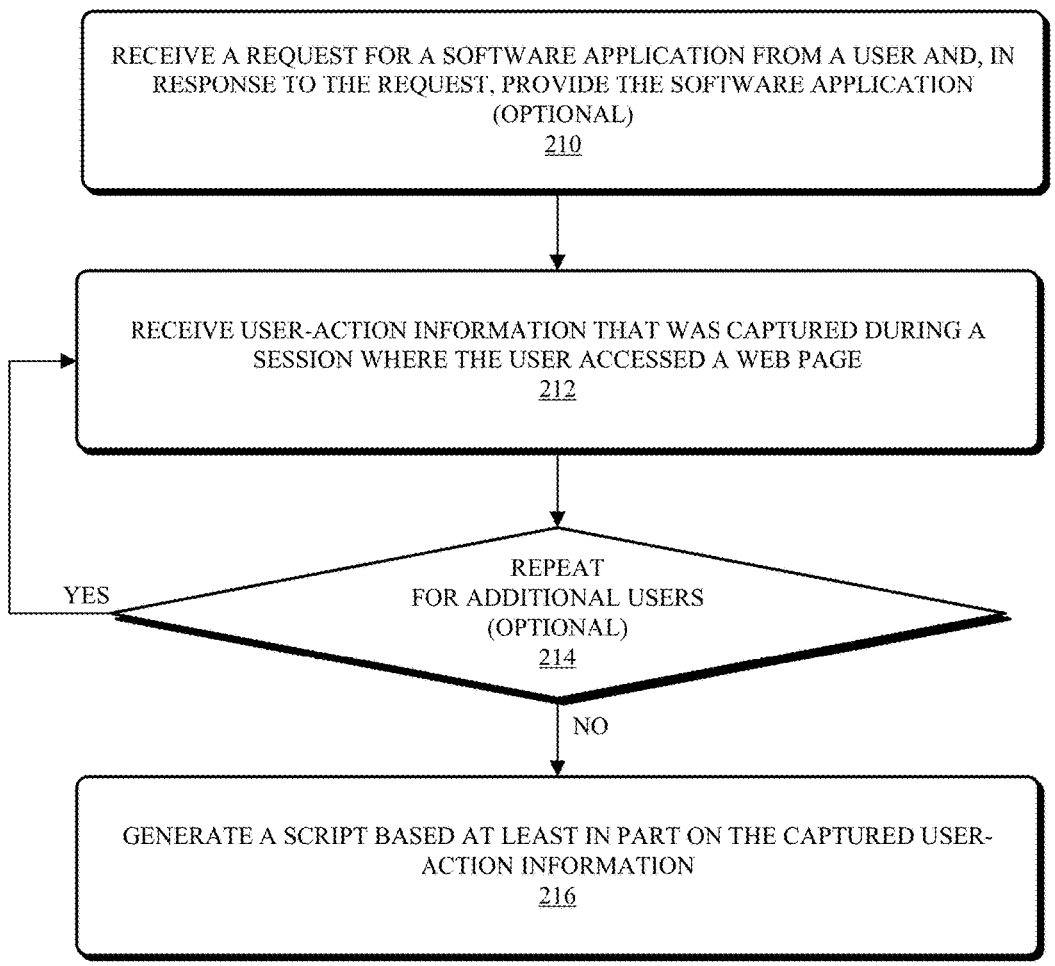
FIG. 2 is a flow chart illustrating a process for generating a script in accordance with an embodiment of the present invention.

FIG. 2 presents a flow chart illustrating a process 200 for generating a script (such as a scraping script), which may be performed by a computer system. During operation, the computer system receives user-action information that was captured during a session where a user accessed a web page (212). This captured user-action information includes information about how the user navigated through the web page during the session, a layout of the web page, and data locations on the web page. Then, the computer system generates the script based at least in part on the captured user-action information (216), where the script is configured to execute on the computer system to scrape information from the web page without user intervention, and where generating the script involves translating the captured user-action information into executable operations. This script may be used to scrape information for this user and/or for other users (such as users that have provided credential information).

In some embodiments, generating the script involves determining changes to the web page based at least in part on the captured user-action information and revising an existing script based at least in part on the determined changes.

Note that the user-action information may have been captured by a software application (such as the web-browser extension) that executes in a virtual environment of a web browser. In some embodiments, prior to receiving the user-action information, the computer system optionally receives a request for the software application from the user and, in response to the request, provides the software application (210).

In some embodiments, the computer system optionally repeats (214) the receiving operation for multiple users in multiple sessions. Then, using the captured user-information from the multiple users, the computer system may generate the script (216). This may be useful because when fixing a problem with the script (such as a problem associated with one type of financial account), a new problem may occur with a different type of financial account. By capturing and using user-action information from multiple users to generate the script (216), the likelihood of causing additional problems may be reduced or eliminated.

In some embodiments of process 200, there may be additional or fewer operations. Moreover, the order of the operations may be changed and/or two or more operations may be combined into a single operation.

In an exemplary embodiment, the captured user-action information includes a sequence of one or more events (which is sometimes referred to as an event file) in which the given user highlighted or provided data in one or more of web-page elements 110 (FIG. 1). These events may or may not include communication with a host system for the website (such as a server or computer system). For example, during some events, the given user clicks on a submit icon or button on web page 100 (FIG. 1), which communicates information with the host computer. (This type of event is sometimes referred to as a form post.) However, during other events, the given user selects a choice in a pull-down menu, which does not require communication with the host system. In either case, the web-browser extension may capture: user actions, the order of the user actions, the location of web-page elements 110 in FIG. 1 (e.g., HTML code associated with web page 100 in FIG. 1), and/or what the given user typed and/or clicked on. Note that the user-action information may include metadata associated with web-page elements 110 (FIG. 1) (such as data fields and what they mean), which may specify types of data associated with one or more of web-page elements 110 (FIG. 1).

In some embodiments, the web-browser extension may avoid capturing sensitive information. Consequently, the user-action information may exclude credential information provided by the user through a website during a given session.

Furthermore, the captured user-action information may specify at least a portion of a hierarchical structure of web page 100 (FIG. 1). This hierarchical structure may specify the layout of web page 100 (FIG. 1) and web-page elements 110 (FIG. 1). For example, the hierarchical structure may include a set of nodes corresponding to an eXtensible markup language (XML) path (XPath) of web-page elements 110 (FIG. 1).

Each of the user actions (such as a form post) may be subsequently translated into an equivalent macro command, which may be pre-populated with any web-page-element information (such as a form name, etc.). Furthermore, for a given web-page element that the user accessed, the associated XPath may be broken down into a corresponding macro sequence that allows this web-page element to be reached. This is illustrated in Table 1. In this example, an XPath to the third row in a table on a web page is converted into the listed macro commands. Collectively, the combination of macro commands results in a scraping script that can navigate and download specific information from web page 100 (FIG. 1).

TABLE 1

Figure 3:
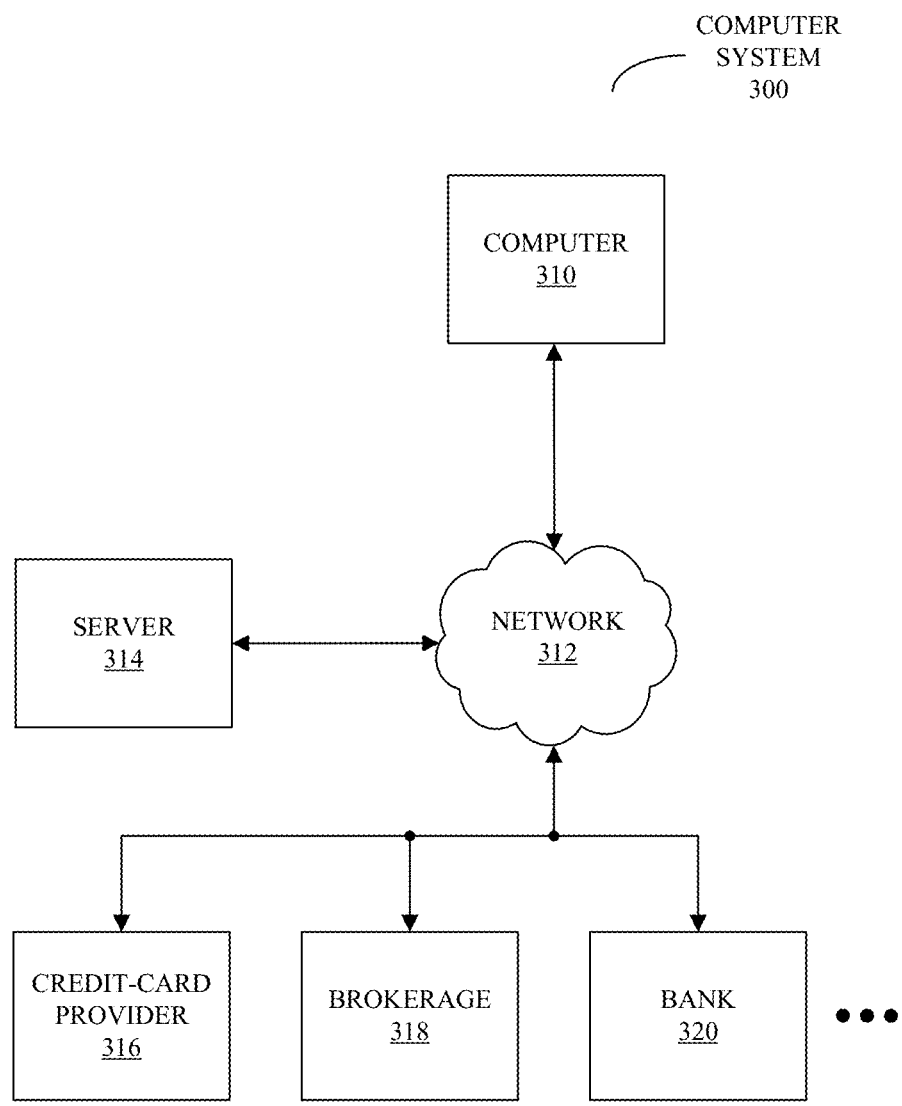
FIG. 3 is a block diagram illustrating a networked computer system that generates and executes a script in accordance with an embodiment of the present invention.

XPath:
//HTML/BODY[1]/TABLE[1]/TBODY[1]/TR[2]/TD[1]
Macro commands:
,MoveToTag,"HTML",
,MoveToTag,"BODY",
,MoveToTable,, TABLE 1-continued ,MoveToTableRow,,
,MoveToTableRow,, We now describe embodiments of a computer system that performs process 200. FIG. 3 presents a block diagram illustrating a networked computer system 300 that generates and executes a scraping script. In this computer system, a user of computer 310 may use financial software. This financial software may be a stand-alone application or a portion of another application that is resident on and which executes on computer 310. Alternatively and/or additionally, at least a portion of the financial software may be a financial-software application tool (provided by server 314 via network 312) that is embedded in a web page (and which executes in a virtual environment of a web browser). In an illustrative embodiment, the software-application tool is a software package written in: JavaScript™ (a trademark of Sun Microsystems, Inc.), e.g., the software-application tool includes programs or procedures containing JavaScript instructions, ECMAScript (the specification for which is published by the European Computer Manufacturers Association International), VBScript™ (a trademark of Microsoft, Inc.) or any other client-side scripting language. In other words, the embedded software-application tool may include programs or procedures containing: JavaScript, ECMAScript instructions, VBScript instructions, or instructions in another programming language suitable for rendering by the web browser or another client application on computer 310.

A provider of the financial software may generate scraping scripts, which are resident on and which execute on server 314. These scraping scripts may collect user financial-account information from one or more financial institutions, such as credit-card provider 316, brokerage 318 and/or bank 320. For example, a given scraping script may collect the user financial-account information by accessing one or more web pages and/or websites of the one or more financial institutions.

Furthermore, the collected user information may be used by the financial software. For example, the collected user financial-account information may be pre-filled into forms in the financial software, thereby making it easier for the user to use the financial software.

To assist the provider of the financial software, the user may request and install a web-browser extension on computer 310. For example, in response to the request, server 314 may provide the web-browser extension to computer 310 via network 312. As discussed previously, when enabled by the user, the web-browser extension may capture user-action information during a session in which the user accesses one or more financial accounts and navigates through one or more web pages of the one or more financial institutions.

Subsequently, the captured user-action information (such as one or more event files) may be uploaded by the web-browser extension to server 314 via network 312. This captured user-action information may be used to create one or more new scraping scripts and/or to maintain the existing scraping script.

Note that the collected user financial-account information and/or the captured user-action information may be stored on server 314 and/or at one or more other locations in computer system 300 (i.e., locally or remotely). Moreover, because this information may be sensitive in nature, it may be encrypted. For example, stored information and/or information communicated via network 312 may be encrypted.

Computers and servers in computer system 300 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, network 312 may include: the Internet, World Wide Web (WWW), an intranet, LAN, WAN, MAN, or a combination of networks, or other technology enabling communication between computing systems.

In exemplary embodiments, the financial software includes: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial software may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), and/or other payroll or accounting software capable of processing payroll information.

Figure 4:
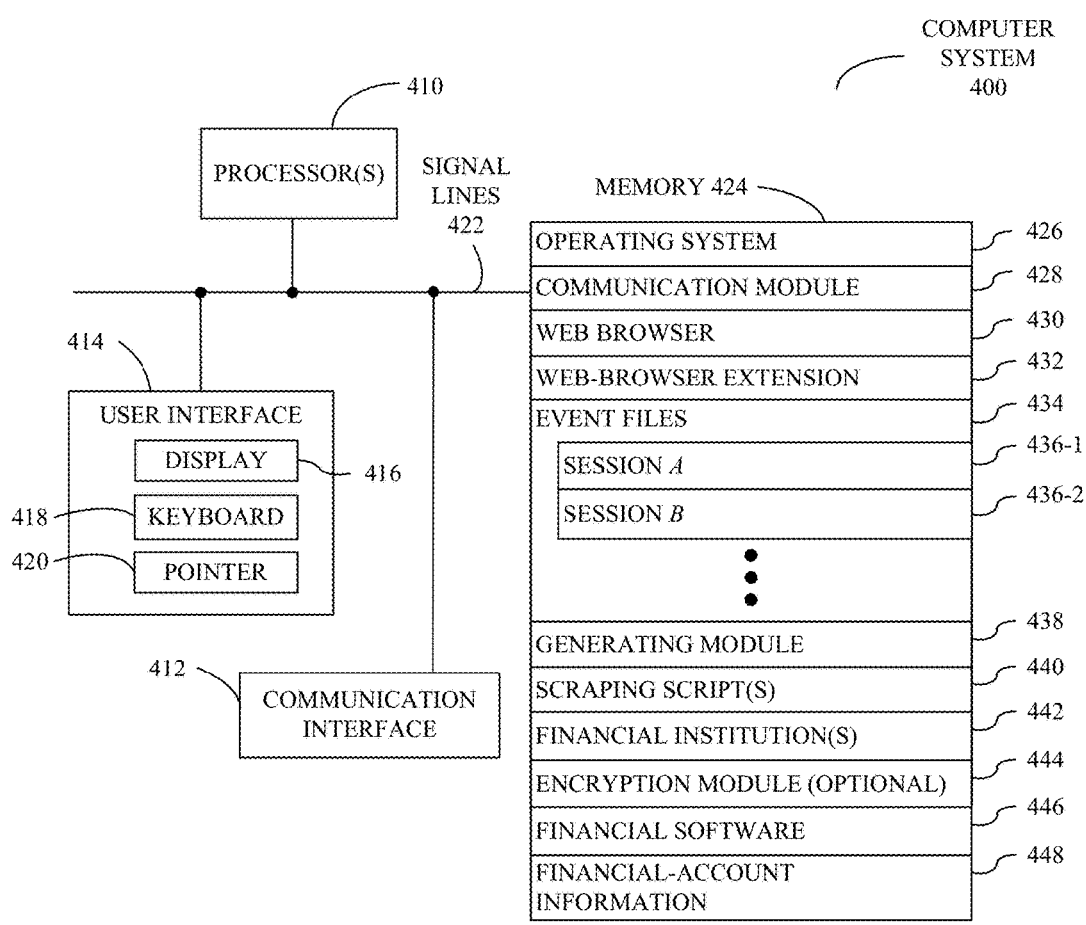
FIG. 4 is a block diagram illustrating a computer system that generates and executes a script in accordance with an embodiment of the present invention.

FIG. 4 presents a block diagram illustrating a computer system 400 that generates and/or executes a scraping script. Computer system 400 includes one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to the computer system 400.

Memory 424 may also include multiple program modules (or sets of instructions), including: web browser 430 (or a set of instructions), web-browser extension 432 (or a set of instructions), generating module 438 (or a set of instructions), optional encryption module 444 (or a set of instructions) and/or financial software 446 (or a set of instructions). Note that one or more of these program modules (or sets of instructions) may constitute a computer-program mechanism.

When requested by a user, web-browser extension 432 may be installed on a user's computer. This web-browser extension 432 may execute in a virtual environment of web browser 430 (which may also be installed on the user's computer). Web-browser extension may capture user-action information while the user accesses one or more financial accounts and navigates through one or more web pages of one or more financial institutions 442.

Subsequently, the captured user-action information may be provided to computer system 400. For example, captured user-action information for one or more users may be stored in event files 434, such as event files for session A 436-1 and session B 436-2.

Next, generating module 438 may use the captured user-action information to generate one or more scraping scripts 440. These scraping scripts may be executed on computer system 400 to collect user financial-account information 448, which may be used by financial software 446 (for example, to fill in forms for one or more users). Note that one or more scraping scripts 440 may execute without direct user control. For example, a scraping script may execute (using stored user credential information) without a user request.

In some embodiments, at least some of the information stored in memory 424 and/or at least some of the information communicated using communication module 428 is encrypted using optional encryption module 444.

In some embodiments, the scraping script is generated on a separate computer system than the one on which it executes. In these embodiments, financial software 446 is on a separate computer system from generating module 438. However, in other embodiments the scraping script is generated on and executes on the same computer system.

Instructions in the various modules in the memory 424 may be implemented in: a high-level procedural language, an object-oriented programming language, and/or in an assembly or machine language. Note that the programming language may be compiled or interpreted, e.g., configurable or configured, to be executed by the one or more processing units 410.

Although the computer system 400 is illustrated as having a number of discrete items, FIG. 4 is intended to be a functional description of the various features that may be present in the computer system 400 rather than a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more application-specific integrated circuits (ASICs) and/or one or more digital signal processors (DSPs).

Computer systems 300 (FIG. 3) and/or 400 may include fewer components or additional components. Moreover, two or more components may be combined into a single component, and/or a position of one or more components may be changed. In some embodiments, the functionality of the computer system 400 may be implemented more in hardware and less in software, or less in hardware and more in software, as is known in the art.

Figure 5:
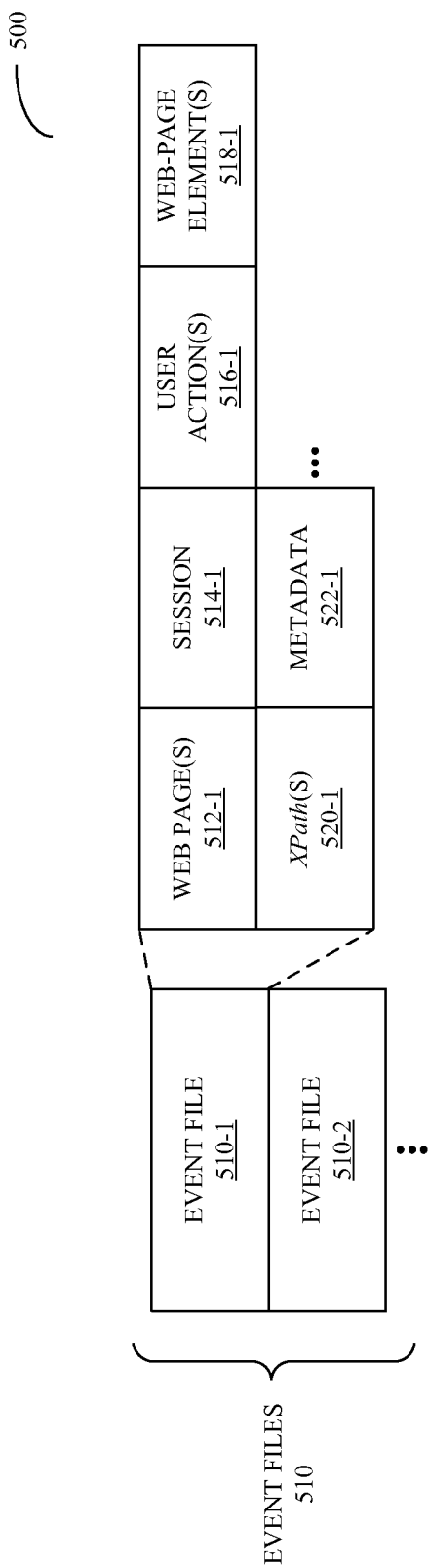
FIG. 5 is a block diagram illustrating a data structure in accordance with an embodiment of the present invention.

We now discuss a data structure that may be used in computer systems 300 (FIG. 3) and 400. FIG. 5 presents a block diagram illustrating a data structure 500. This data structure may include information for event files 510, such as event files 510-1 and 510-2. For example, event file 510-1 may include: one or more web pages 512-1 accessed by one or more users, session 514-1 information, one or more user actions 516-1, one or more web-page elements 518-1 the one or more users accessed, one or more XPaths 520-1 associated with web-page elements 518-1, and/or metadata 522-1 associated with web-page elements 518-1. Note that event file 510-1 may also include a sequential order of user actions 516-1.

In some embodiments of data structure 500, there may be fewer or additional components. For example, data structure 500 may include the HTML code for the one or more web pages 512-1. Moreover, two or more components may be combined into a single component and/or a position of one or more components may be changed.

While a scraping script for use with websites associated with financial institutions has been used as an illustrating example in the preceding discussion, in other embodiments the scripting technique may be used to create or maintain a scraping script for use with web pages or websites associated with a wide variety of organizations (including pharmacies, healthcare providers and/or health-insurance companies), as well as with types of user accounts other than financial accounts.

Furthermore, the scraping script may also be used for other purposes, such as user identity validation and/or user authentication. For example, using user provided credential information, the scraping script may attempt to access a user account via the website of a financial institution. If successful, this process may confirm the user's identity and authorization to perform financial transactions.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for generating a script, comprising:
retrieving a script for scraping information from a website of a financial institution, wherein the scraped information is associated with a financial account at the financial institution, and wherein the script is configured to execute on a computer system to scrape information from the website without user intervention;
receiving user-action information that was captured during a first session where a first user traversed one or more pages of a website of a financial institution while accessing the first user's financial account at the financial institution, wherein the received user-action information includes information about how the first user traversed the one or more pages of the website during the first session, a layout of the traversed one or more pages of the website, and data locations on the traversed one or more pages of the website;
translating the received user-action information into executable operations to perform the received user-actions on the traversed one or more pages of the website without user intervention;
determining changes to the traversed one or more pages of the website relative to a version of the one or more pages of the website used to generate the retrieved script based at least in part on the received user-actions;
automatically revising the retrieved script based at least in part on the determined changes and received user-action information to resolve a first problem with the script associated with the determined changes;
replacing the retrieved script with the revised script;
authenticating to a web server that hosts the website of the financial institution with credentials of a second user for accessing the second user's financial account at the financial institution;
retrieving the revised script;
executing the revised script on the computer system, thereby causing the computer system to navigate the website on behalf of the second user;
scrape new information for the second user from the second user's financial account at the financial institution;
determining, based on user-action information of the second user captured during a second session where the second user traversed the one or more pages of the website while accessing the second user's financial account at the financial institution, a second set of changes to the website undetected from the user-action information captured during the first session;
automatically generating a second revised script based on the revised script, the determined second set of changes, and the user-action information of the second user; and
replacing the revised script with the second revised script.

2. The method of claim 1, wherein the user-action information captured during the first session and the user-action information captured during the second session was captured by a software application that executes in a virtual environment of a web browser.

3. The method of claim 2, wherein prior to receiving the user-action information captured during the first session of the first user, the method further comprises:
receiving a request for the software application from the first user; and
in response to the request, providing the software application.

4. The method of claim 1, wherein the user-action information captured during the first session excludes credential information provided by the first user through the web page during the first session.

5. The method of claim 1, wherein the user-action information captured during the first session and the user-action information captured during the second session includes metadata associated with the data locations; and wherein the metadata specifies types of data.

6. The method of claim 1, wherein the user-action information captured during the first session and the user-action information captured during the second session includes one or more events in which the user communicated information with a host system that hosts the web page.

7. The method of claim 6, wherein, during at least one of the one or more events, the first user provided data to the host system.

8. The method of claim 1, wherein the user-action information captured during the first session and the user-action information captured during the second session includes information corresponding to at least a portion of a hierarchical structure of the web page; and wherein at least the portion of the hierarchical structure specifies the layout of the web page and the data locations.

9. The method of claim 8, wherein the hierarchical structure includes a set of nodes corresponding to an eXtensible Markup Language (XML) path.

10. The method of claim 1, wherein the receiving operation is repeated for multiple users in multiple sessions and the generating operation is based at least in part on captured user-information from the multiple users.

11. A computer-program product for use in conjunction with a computer system, the computer-program product comprising a non-transitory computer-readable storage medium and a computer-program mechanism embedded therein for configuring the computer system to generate a script, the computer-program mechanism including:
  instructions for retrieving a script for scraping information from a website of a financial institution, wherein the scraped information is associated with a financial account at the financial institution, and wherein the script is configured to execute on a computer system to scrape information from the website without user intervention;
  instructions for receiving user-action information that was captured during a first session where a first user traversed one or more pages of a website of a financial institution while accessing the first user's financial account at the financial institution, wherein the received user-action information includes information about how the first user traversed the one or more pages of the website during the first session, a layout of the traversed one or more pages of the website, and data locations on the traversed one or more pages of the website;
  instructions for translating the received user-action information into executable operations to perform the received user-actions on the traversed one or more pages of the website without user intervention;
  instructions for determining changes to the traversed one or more pages of the website relative to a version of the one or more pages of the website used to generate the retrieved script based at least in part on the received user-actions;
  instructions for automatically revising the retrieved script based at least in part on the determined changes and received user-action information to resolve a first problem with the script associated with the determined changes;
  instructions for replacing the retrieved script with the revised script;
  instructions for authenticating to a web server that hosts the website of the financial institution with credentials of a second user for accessing the second user's financial account at the financial institution;
  instructions for retrieving the revised script;
  instructions for executing the revised script on the computer system, thereby causing the computer system to navigate the website on behalf of the second user,
  instructions for scraping new information for the second user from the second user's financial account at the financial institution;
  instructions for determining, based on user-action information of the second user captured during a second session where the second user traversed the one or more pages of the website while accessing the second user's financial account at the financial institution, a second set of changes to the website undetected from the user-action information captured during the first session;
  instructions for automatically generating a second revised script based on the revised script, the determined second set of changes, and the user-action information of the second user; and
  instructions for replacing the revised script with the second revised script.

12. The computer-program product of claim 11, wherein the user-action information captured during the first session and the user-action information captured during the second session was captured by a software application that executes in a virtual environment of a web browser.

13. The computer-program product of claim 12, wherein prior to receiving the user-action information captured during the first session, the computer-program product further comprises:
  instructions for receiving a request for the software application from the first user; and
  in response to the request, instructions for providing the software application.

14. The computer-program product of claim 11, wherein the user-action information captured during the first session and the user-action information captured during the second session includes metadata associated with the data locations; and wherein the metadata specifies types of data.

15. The computer-program product of claim 11, wherein the user-action information captured during the first session and the user-action information captured during the second session includes one or more events in which the first user communicated information with a host system that hosts the web page.

16. The computer-program product of claim 15, wherein, during at least one of the one or more events, the first user provided data to the host system.

17. The computer-program product of claim 11, wherein the user-action information captured during the first session and the user-action information captured during the second session includes information corresponding to at least a portion of a hierarchical structure of the web page; and wherein at least the portion of the hierarchical structure specifies the layout of the web page and the data locations.

18. The computer-program product of claim 11, wherein the receiving operation is repeated for multiple users in multiple sessions and the generating operation is based at least in part on captured user-information from the multiple users.

19. A computer system, comprising:
  a processor; and
  memory having instructions thereon which, when executed by the processor, performs an operation:
    retrieving a script for scraping information from a website of a financial institution, wherein the scraped information is associated with a financial account at the financial institution, and wherein the script is configured to execute on a computer system to scrape information from the website without user intervention,
    receiving user-action information that was captured during a first session where a first user traversed one or more pages of a website of a financial institution while accessing the first user's financial account at the financial institution, wherein the received user-action information includes information about how the first user traversed the one or more pages of the website during the first session, a layout of the traversed one or more pages of the website, and data locations on the traversed one or more pages of the website, translating the received user-action information into executable operations to perform the received user-actions on the traversed one or more pages of the website without user intervention, determining changes to the traversed one or more pages of the website relative to a version of the one or more pages of the website used to generate the retrieved script based at least in part on the received user-actions, automatically revising the retrieved script based at least in part on the determined changes and received user-action information to resolve a first problem with the script associated with the determined changes, replacing the retrieved script with the revised script, authenticating to a web server that hosts the website of the financial institution with credentials of a second user for accessing the second user's financial account at the financial institution, retrieving the revised script, executing the revised script on the computer system, thereby causing the computer system to navigate the website on behalf of the second user, scrape new information for the second user from the second user's financial account at the financial institution, determining, based on user-action information of the second user captured during a second session where the second user traversed the one or more pages of the website while accessing the second user's financial account at the financial institution, a second set of changes to the website undetected from the user-action information captured during the first session, automatically generating a second revised script based on the revised script, the determined second set of changes, and the user-action information of the second user, and replacing the revised script with the second revised script.

\* \* \* \* \*